United States Patent [19]

Kurosawa et al.

[11] Patent Number: 5,018,189
[45] Date of Patent: May 21, 1991

[54] COMMUNICATION APPARATUS WITH TELEPHONE AND DATA COMMUNICATION CAPABILITY

[75] Inventors: Yuji Kurosawa, Kawasaki; Hisao Terajima; Shingo Isozaki, both of Yokohama, all of Japan

[73] Assignee: Canon Kabushiki Kaisha, Tokyo, Japan

[21] Appl. No.: 367,671

[22] Filed: Jun. 19, 1989

[30] Foreign Application Priority Data

Jun. 23, 1988 [JP] Japan ............................ 63-153456
Jun. 23, 1988 [JP] Japan ............................ 63-153457
Jun. 26, 1988 [JP] Japan ............................ 63-153458

[51] Int. Cl.⁵ .................................... H04M 11/00
[52] U.S. Cl. ............................ 379/93; 379/100
[58] Field of Search .......... 379/93, 355, 88, 97, 379/100

[56] References Cited

U.S. PATENT DOCUMENTS

| | | | |
|---|---|---|---|
| 4,585,907 | 4/1986 | Giammarrusco | 379/88 |
| 4,821,312 | 4/1989 | Horton et al. | 379/97 |
| 4,833,705 | 5/1989 | Kobayashi | 379/355 |
| 4,850,008 | 7/1989 | Berg et al. | 379/93 |

FOREIGN PATENT DOCUMENTS

| | | | |
|---|---|---|---|
| 05149 | 1/1989 | Japan | 379/355 |
| 80197 | 3/1989 | Japan | 379/355 |

Primary Examiner—Jin F. Ng
Assistant Examiner—Ahmad F. Matar
Attorney, Agent, or Firm—Fitzpatrick, Cella, Harper & Scinto

[57] ABSTRACT

A communication apparatus has a telephone set and a data communication unit integral or combined with the telephone set and is capable of sending a call through dialing means of the telephone set. The communication apparatus comprises switching means for selectively connecting a telephone line to a line of the telephone set or a line of the data communication unit and detection means connected to the telephone set for detecting a predetermined protocol signal sent back from a destination station. Control means controls the switching means such that the switching means connects the telephone line to the telephone set at the time of calling to enable dialing using the dialing means of the telephone set, and switches the telephone line to the data communication unit when the detection means detects the protocol signal, in order to start data communication.

10 Claims, 8 Drawing Sheets

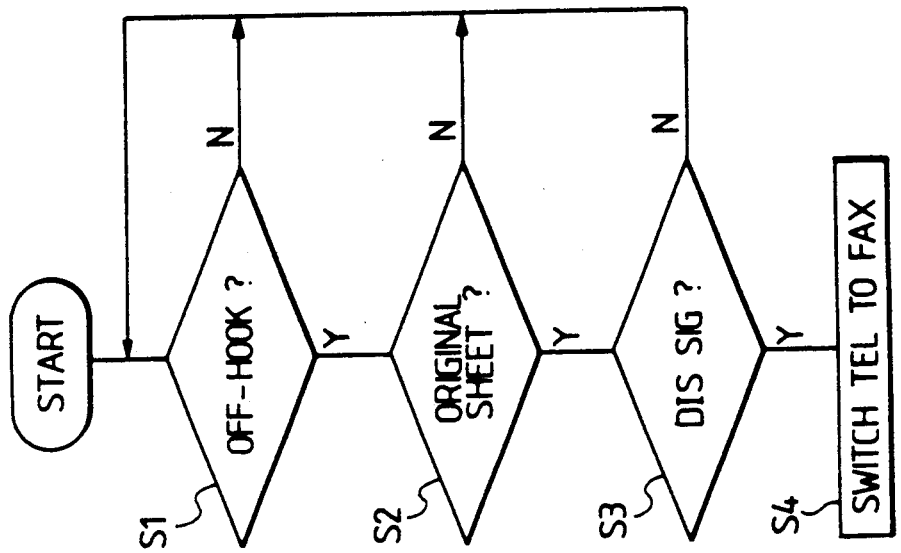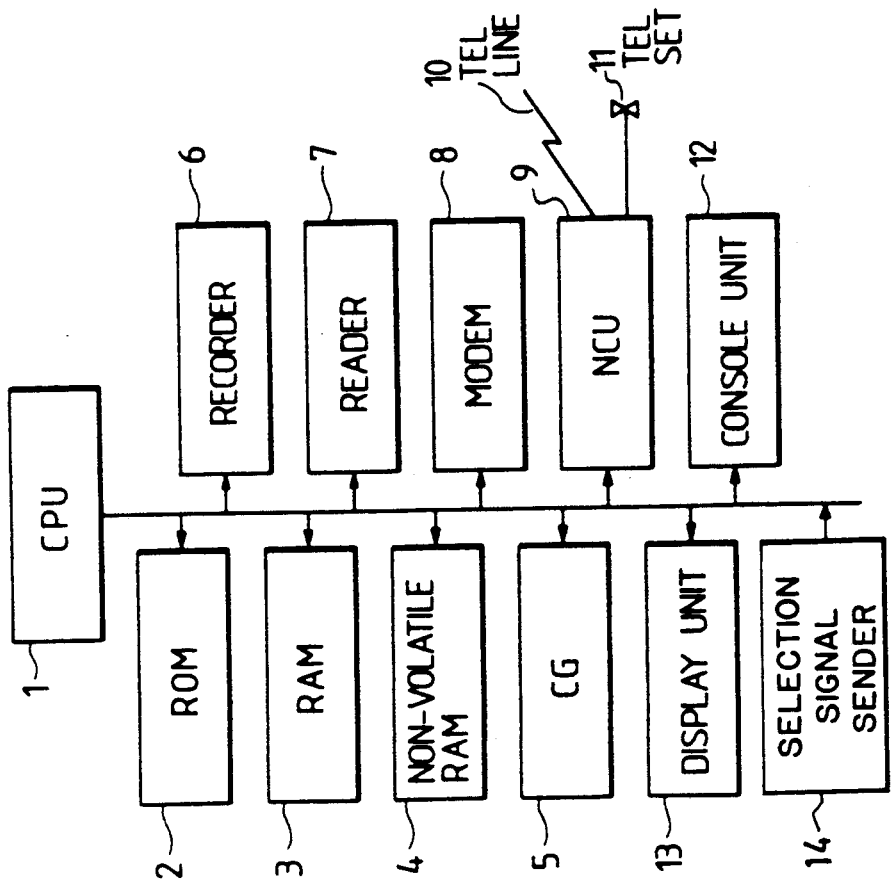

COMMUNICATION APPARATUS WITH TELEPHONE AND DATA COMMUNICATION CAPABILITY

BACKGROUND OF THE INVENTION

1. Field of the Invention

The present invention relates to a communication apparatus, and more particularly to a communication apparatus comprising a telephone set and a data communication unit integral with or combined with the telephone set.

2. Related Background Art

In such a communication apparatus, for example, an apparatus having a telephone set and a facsimile machine integral with or combined with the telephone set, the function of line control for the two units is frequently shared.

Accordingly, a call is made b y means of a dial (or push buttons) of the telephone set, and when facsimile communication is to be done after the line has been connected to a destination station, predetermined operation means such as a start button is depressed. In receiving a call, a hand set of the telephone set is first taken off hook, and if the calling station is a voice terminal, speech communication is performed, and if a signal tone of the facsimile machine is detected, a start button is depressed to start the facsimile communication.

In the prior art apparatus, the line is switched from the telephone set to the facsimile machine immediately after the depression of the start button. Accordingly, some provision is required to cause an operator to depress the start button after he/she has recognized the line connection. Thus, the following problems arise in the calling operation.

(1) The operator's depression of the start key is required.

(2) The operator must depress the start key after the dialing has been completed, that is, after all dialing signals have been sent out. In the pulse dialing system, a waiting time therefor is long.

The dialing technique is disclosed in U.S. Pat. Nos. 4,825,461, 4,833,705 and 4,947,423, and in U.S. Pat. applications Ser. Nos. 080,093, filed on July 31, 1987, and refiled as Ser. No. 546,685 on July 2, 1990; Ser. No. 165,477, filed on Mar. 8, 1988, and refiled as Ser. No. 471,004 on Jan. 25, 1990; and Ser. No. 325,997, filed on Mar. 20, 1989.

The technique for switching the telephone set and the facsimile machine is disclosed in U.S. Pat. Nos. 4,353,097, 4,800,439, 4,677,660, 4,932,048, 4,916,607 and 4,815,121, and in U.S. Pat. applications Ser. Nos. 108,915, filed on Oct. 15, 1987, refiled as Ser. No. 453,364 on Dec. 20, 1989; and 106,783, filed on Oct. 13, 1987. However, no proposal which solves the above problems has been made.

SUMMARY OF THE INVENTION

It is an object of the present invention to provide an improved communication apparatus which solves the above problems.

It is another object of the present invention to provide a communication apparatus which can automatically start communication without troublesome operation.

It is a further object of the present invention to provide a communication apparatus which can automatically start communication when a call is made from a telephone set.

Other objects of the present invention will be apparent from the detailed description of the preferred embodiments taken in conjunction with the accompanying drawings.

BRIEF DESCRIPTION OF THE DRAWINGS

FIG. 1 shows a block diagram of an embodiment of a facsimile machine,

FIG. 3 is a flow chart showing a control operation of a CPU in the first embodiment.

DETAILED DESCRIPTION OF THE PREFERRED EMBODIMENTS

Figure 2:
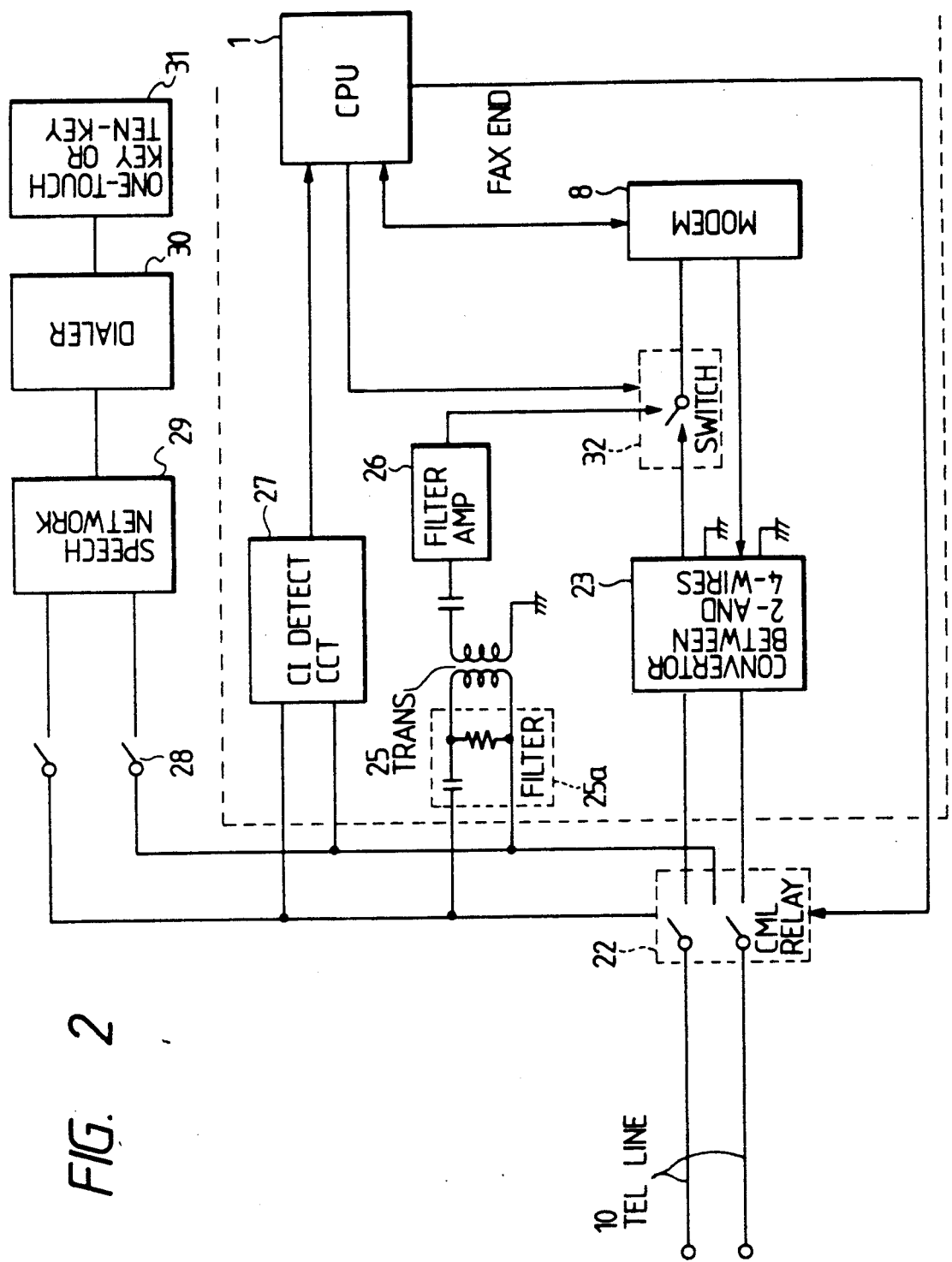
FIG. 2 shows a block diagram of a first embodiment of a line control unit.

The preferred embodiments of the present invention will be explained in detail with reference to the drawings.

In the following embodiment, a telephone set and a facsimile machine are integral or combined.

FIG. 1 shows a block diagram of a first embodiment of the present invention.

A CPU 1 comprises a microprocessor and controls the overall facsimile machine, that is, a RAM 3, a non-volatile RAM 4, a character generator (CG) 5, a recorder 6, a reader 7, a modem 8, a network control unit (NCU) 9, a console unit 12, a display unit 13 and a selection signal sender 14, in accordance with a program stored in a ROM 2.

The RAM 3 stores binary image data read by the reader 7 or binary image data to be recorded by the recorder 6, and stores binary image data modulated by the modem 8 and supplied to the telephone line 10 through the NCU 9.

The RAM 3 stores binary data demodulated from an analog waveform supplied from the telephone line 10 by the NCU 9 and the modem 8.

The non-volatile RAM 4 stores the data to be retained even after the power supply of the facsimile machine has been turned off. The non-volatile RAM 4 serves well as registration means in which destination names and destination telephone numbers are registered through the console unit 12.

The CPU 1 functions as transmission means for transmitting the destination name corresponding to the input destination telephone number to the destination receiver, in accordance with the program stored in the ROM 2.

The CG (character generator) 5 is a ROM which contains characters such as JIS codes or ASCII codes and reads character data corresponding to a specific code by 2-byte data under the control of the CPU 1.

The recorder 6 comprises a DMA controller, a sub-CPU, a thermal head and a TTL logic IC. It reads the record data stored in the RAM 3 under the control of the CPU 1 and outputs it as a hard copy.

The reader 7 comprises a DMA controller, a sub-CPU, an image sensor and a TTL logic IC. It digitizes the read data to for binary data by using a CCD under the control of the CPU 1 and sequentially sends the binary data to the RAM 3. The loading status of a document sheet in the reader 7 may be detected by a document sheet sensor such as a photo-sensor arranged in a feed path of the document sheet. A document sheet detection signal is supplied to the CPU 1.

The modem 8 comprises G3, G2, G1 and FM modems and a clock generator connected to the modems. It modulates the transmission data stored in the RAM 3 under the control of the CPU 1 and supplies it to the telephone line 10 through the NCU 9. The modem 8 receives the analog signal on the telephone line 10 through the NCU 9, modulates it and stores the binary data in the RAM 3.

The NCU 9 selectively connects the telephone line to the modem 8 or the telephone set 11 under the control of the CPU 1.

The telephone set 11 is integrated with the facsimile machine, and a dial manipulation unit thereof is integrated with the console unit 12. Specifically, the telephone set 11 comprises a hand set, a speech network, a dialer and a ten-key or one-touch keys.

The console unit 12 comprises keys for starting the image transmission or reception, mode selection keys for designating an operation mode such as fine, standard or automatic reception in the transmission or reception mode, and a ten-key for dialing. The CPU 1 detects the depression status of those keys and controls the units in accordance with the depression status.

The display unit 13 is a liquid crystal display which can display 16 digits. It displays selected characters under the control of the CPU 1.

FIG. 2 shows a configuration of the line control unit (the NCU and the telephone set) of the apparatus of FIG. 1.

In FIG. 2, numeral 10 denotes the telephone line which is connected to a CML relay 22 which is a principal part of the NCU 9. The CML relay 22 connects the 2-wire line 10 to a hook switch 28 of the telephone set or the facsimile machine (broken-line block).

The hook switch 28, a call signal detection circuit 27 of the facsimile machine and a transformer 25 are connected to the line downstream of the CML relay 22. The call signal detection circuit 27 detects a call signal from a switching unit. It may comprise a photocoupler. The call signal detection output is supplied to the CPU 1.

The transformer 25 is an isolation transformer having a high impedance on the side of the facsimile machine. It is AC-coupled to the line through a filter 25a. A filtering amplifier 26 is connected to the transformer 25. It is connected to the modem 8 through a switch 32.

The modem 8 is connected to the CML relay 22 through a conversion circuit 23 such as a hybrid circuit which converts the 2-wire transmission/reception signal to a 4-wire signal.

A dialer 30 is connected to the hook switch 28 controlled by the hand set (not shown) through a speech network 29. The dialer 30 is controlled by the ten-key or one-touch key 31 which is the dialing means. The switch 32 and the CML relay 22 are controlled by the CPU 1.

The operation of the above configuration is now explained.

In the present embodiment, when the call status is detected from the off-hook state of the hand set, the switch 32 is operated to connect the modem 8 to the line of the telephone set in the high impedance state through the transformer 25 and the filtering amplifier 26. (Under this condition, the CML relay 22 connects the line 10 to the hook switch 28.) The signal (in the present case, a DIS signal (digital identification signal)) which is sent back when the destination station is a facsimile machine is detected by the modem 8. If it is detected, the CML relay 22 is switched to the facsimile machine to effect image communication.

The above operation is explained with reference to FIG. 3. FIG. 3 shows a control process of the control program to be executed by the CPU 1 and stored in the ROM 2.

In a step S1 of FIG. 3, the off-hook state of the telephone set 11 is detected. When the off-hook switch 28 of FIG. 2 is closed, the off-hook status is detected. The detection of the off-hook switch 28 is done by a known detection circuit (not shown). While not shown in FIG. 3, the operator may effect the dialing by the ten-key or one-touch key 31 after the off-hooking, either for facsimile communication or for speech communication. The dialing signal determined by the line system is sent from the dialer 30 to the line 10 through the speech network 29, the hook switch 28 and the CML relay 22.

In a step S2, the presence or absence of the document sheet is detected. If the document sheet is present, the DIS signal is detected in a step S3. The detection of the DIS signal is effected by the modem 8 of FIG. 2. Since the DIS signal is contained in an initial identification signal which is sent back after the facsimile machine has received the call, whether the destination station is a facsimile machine or other machine, that is, a voice terminal can be discriminated by the presence or absence of the signal.

When the DIS signal is detected in the step S3, the CML relay 22 is switched to the facsimile machine and the switch 32 is switched to the conversion circuit 23. Thereafter, a known facsimile communication protocol is performed. If the destination station is a facsimile machine, the initial identification signal which contains the DIS signal is sent a plurality of times. Thus, the modem 8 responds to the next initial identification signal, and thereafter facsimile auto-communication is performed in the same manner as in the prior art apparatus.

In this manner, by merely effecting ordinary dialing or one-touch dialing by the ten-key or one-touch key 31, facsimile communication can be automatically started if the destination station is a facsimile unit and if it sends back the DIS signal. Accordingly, facsimile communication can be automatically started without requiring the step of depressing the start key after the predetermined time period needed for sending the dialing signal.

In accordance with the present embodiment, only the transformer 25 for connecting the modem 8 and the filtering amplifier 26 need be added. Accordingly, the cost does not increase greatly.

In the first embodiment described above, whether the transmitting document sheet has been detected by the document sheet detection sensor (not shown) provided in the reader 7 or not is checked in the step S3. However, where the document sheet image to be transmitted is prestored in the memory and the image is transmitted from the memory, whether the document sheet image has been stored in the memory or not is checked in the step S2.

A second embodiment in which the dialing status by the telephone set is monitored and the transmission is automatically started if the facsimile machine is ready to transmit is now explained. The configuration of the apparatus of the second embodiment is identical to that shown in FIG. 1.

Figure 4:
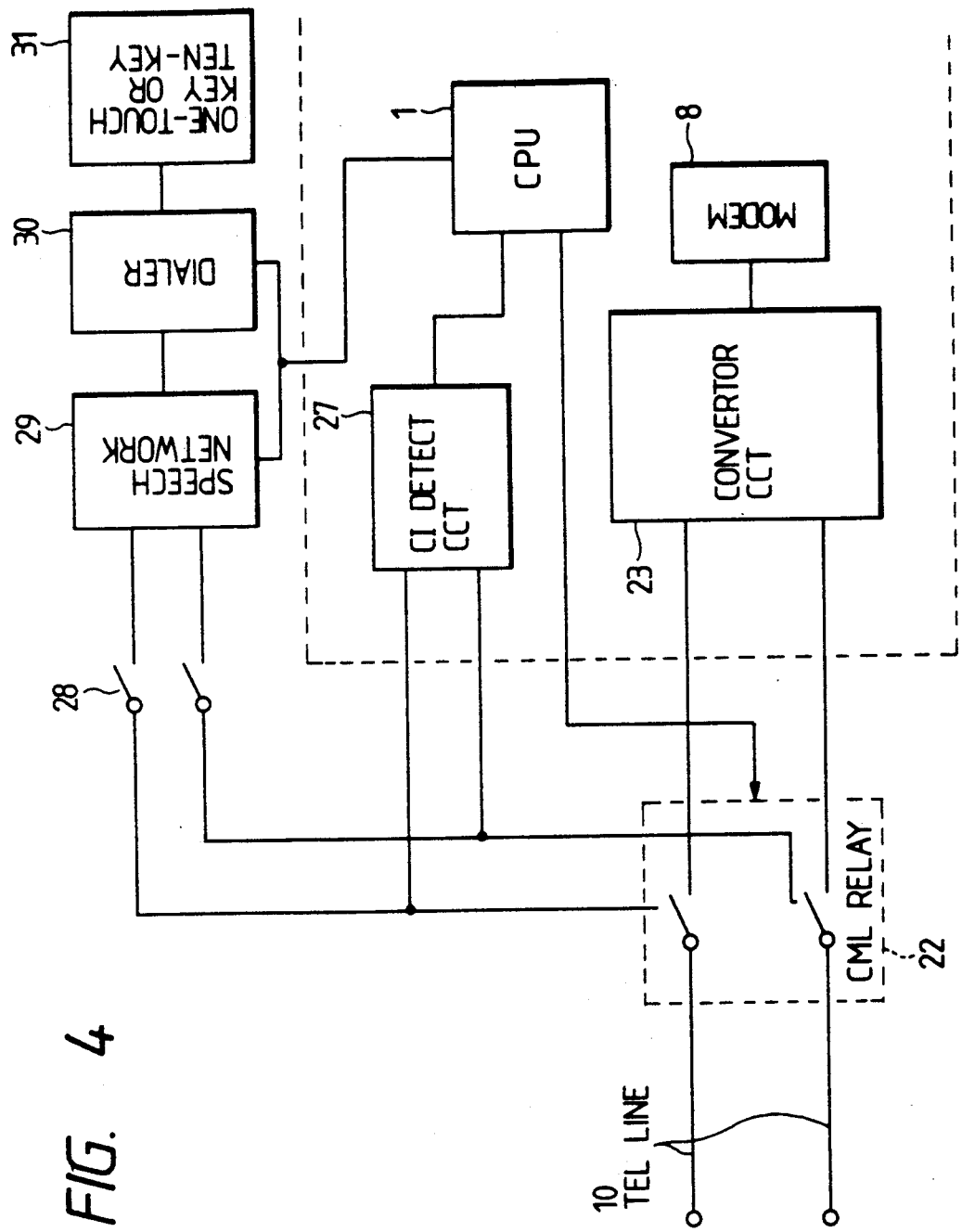
FIG. 4 shows a second embodiment of the line control unit.

FIG. 4 shows a configuration of a line control unit in the apparatus of the second embodiment.

In FIG. 4, numeral 10 denotes the telephone line which is connected to the CML relay 22. The CML relay 22 connects the 2-wire line 10 to one of the hook switch 28 of the telephone set and the facsimile machine (a broken-line block).

The hook switch 28 and a call signal detection circuit 27 of the facsimile machine are connected to the line downstream of the CML relay 22. The call signal detection circuit 27 detects a call signal from a switching unit. It may comprise a photo-coupler. The call signal detection output is supplied to the CPU 1.

The modem 8 is connected to the CML relay 22 through a conversion circuit 23 such as a hybrid circuit which converts the two-wire transmission/reception signal to a four-wire signal.

A dialer 30 is connected to the hook switch 28 controlled by a hand set (not shown), through a speech network 29. The dialer 30 is controlled by a ten-key or one-touch key which thus serves as dialing means for the operator. The switch 32 (in FIG. 2) and the CML relay 22 (in both embodiments) are controlled by the CPU 1.

Figure 5:
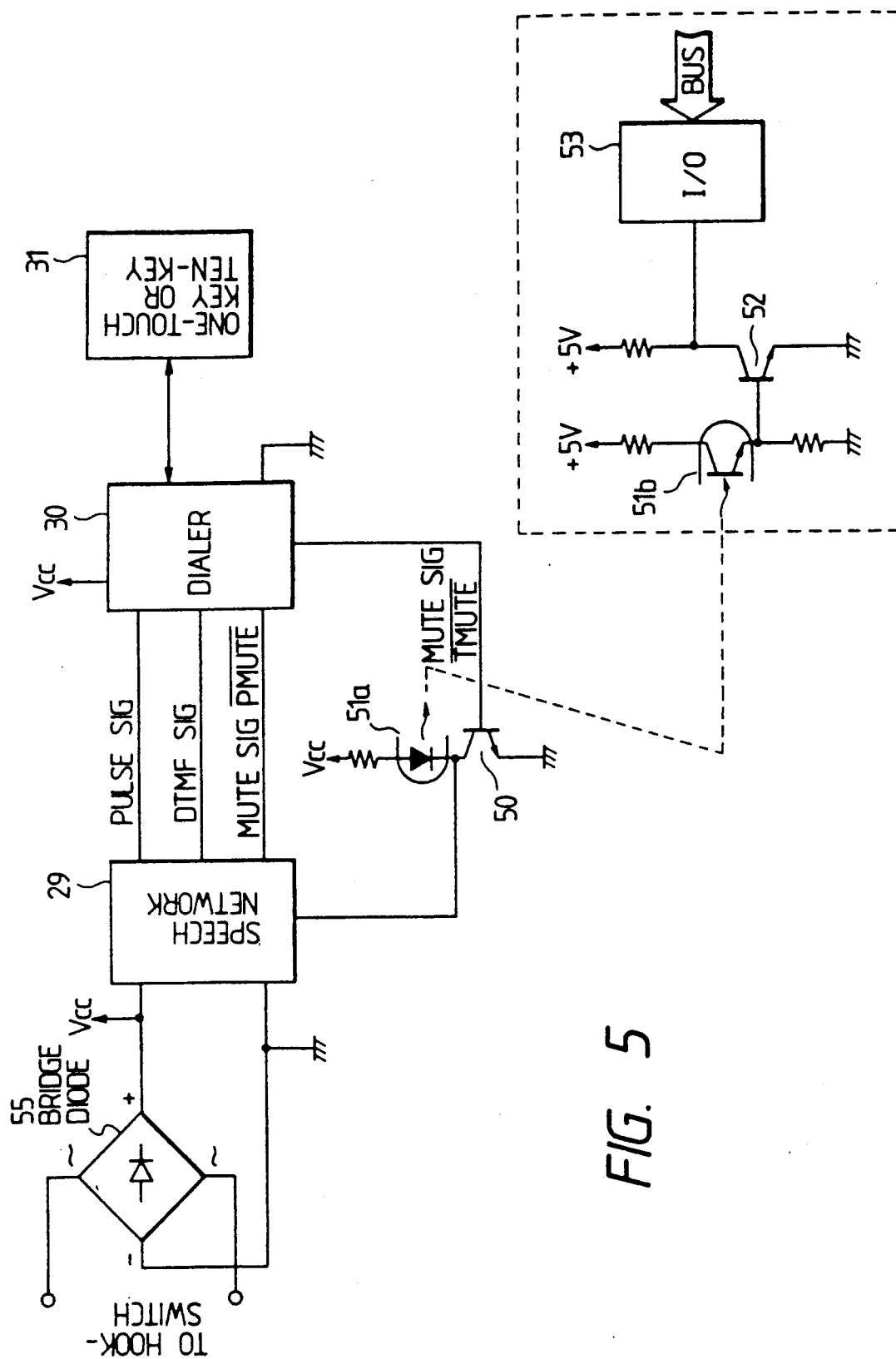
FIG. 5 shows a configuration around a dialing circuit of FIG. 4.

The control status of the speech network 29 and the dialer 30 is detected by the CPU 1; a configuration therefor is shown in FIG. 5.

In FIG. 5, the speech network 29 is connected to the line of the hook switch 28 through a bridge diode 55 which functions to assure the polarity of the line. A positive terminal of the diode output is connected to a power supply and a negative terminal is connected to a ground level of the apparatus. The dialer 30 comprises known IC's. It produces a dialing signal which conforms to one of the lines for the pulse signal and the DTMF (multi-frequency dialing tone) signal.

Figure 6:
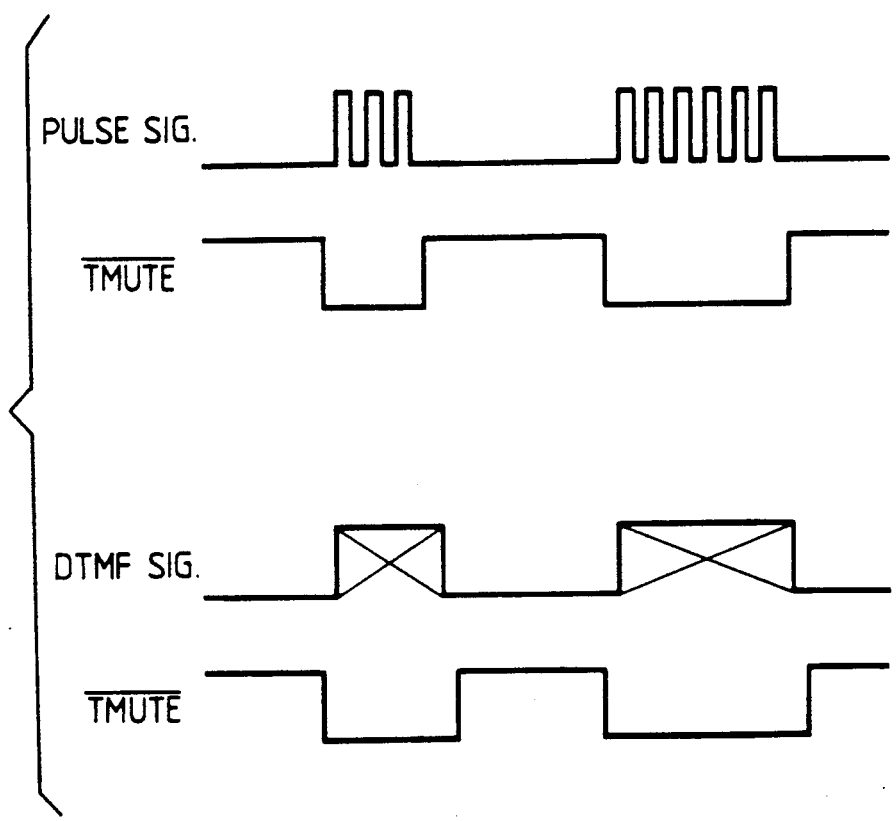
FIG. 6 shows a timing chart for a mute signal produced by a dialer.

The dialer 30 produces a mute signal TMUTE or PMUTE (both are negative logic active) to the speech network 29. It has a function to mute the dialing signal so that it is not output to the hand set connected to the speech network 29. In the dialer 30 of the present embodiment, the mute signal TMUTE is of low level while the dialing signal in the form of pulse signal or the DTMF signal is outputted, as shown in FIG. 6. While it is not used in the present embodiment, the mute signal PMUTE is also of low level while the dialing signal in any form is outputted.

The mute signal TMUTE is inverted by a gate (transistor) 50 and then it is supplied to the speech network 29. Accordingly, the speech network 29 performs the muting when the mute input is of high level.

A photo-coupler LED 51a is inserted in a collector circuit of the gate 50 to inform to the facsimile machine of the status of the mute signal TMUTE in an isolated state. A collector and an emitter of a photo-transistor 51b of the photo-coupler are connected to the power supply (+5 V) and the ground level, through respective resistors, and an emitter potential thereof is supplied to a base of a transistor 52. A collector potential of the transistor 52 is supplied to an input/output port 53 connected to the bus of the CPU 1. Accordingly, the CPU 1 recognizes the status of the mute signal through the I/O port 53 to check whether the dialing is being effected by the telephone set or not.

The operation of the above configuration is now explained.

When the operator sends a call for speech communication or for facsimile communication, he/she dials by using the ten-key or one-touch key 31 of the telephone set. The ten-key or one-touch key 31 produces a dialing signal corresponding to the mode setting for the pulse signal or the DTMF signal. The dialer 30 outputs the signals PMUTE and TMUTE as control signals to the speech network. Of those, the mute signal TMUTE assumes the low level in synchronism with the dialing signal as shown in FIG. 6. The status of the mute signal is detected by the CPU 1 through the photo-coupler and the transistor 52 of FIG. 5.

When the CPU 1 detects the dialing operation and the document sheet to be transmitted has been loaded in the reader 7, it switches the CML relay 22 to the facsimile machine without detecting the manipulation of the start key, to start the facsimile communication.

Figure 7:
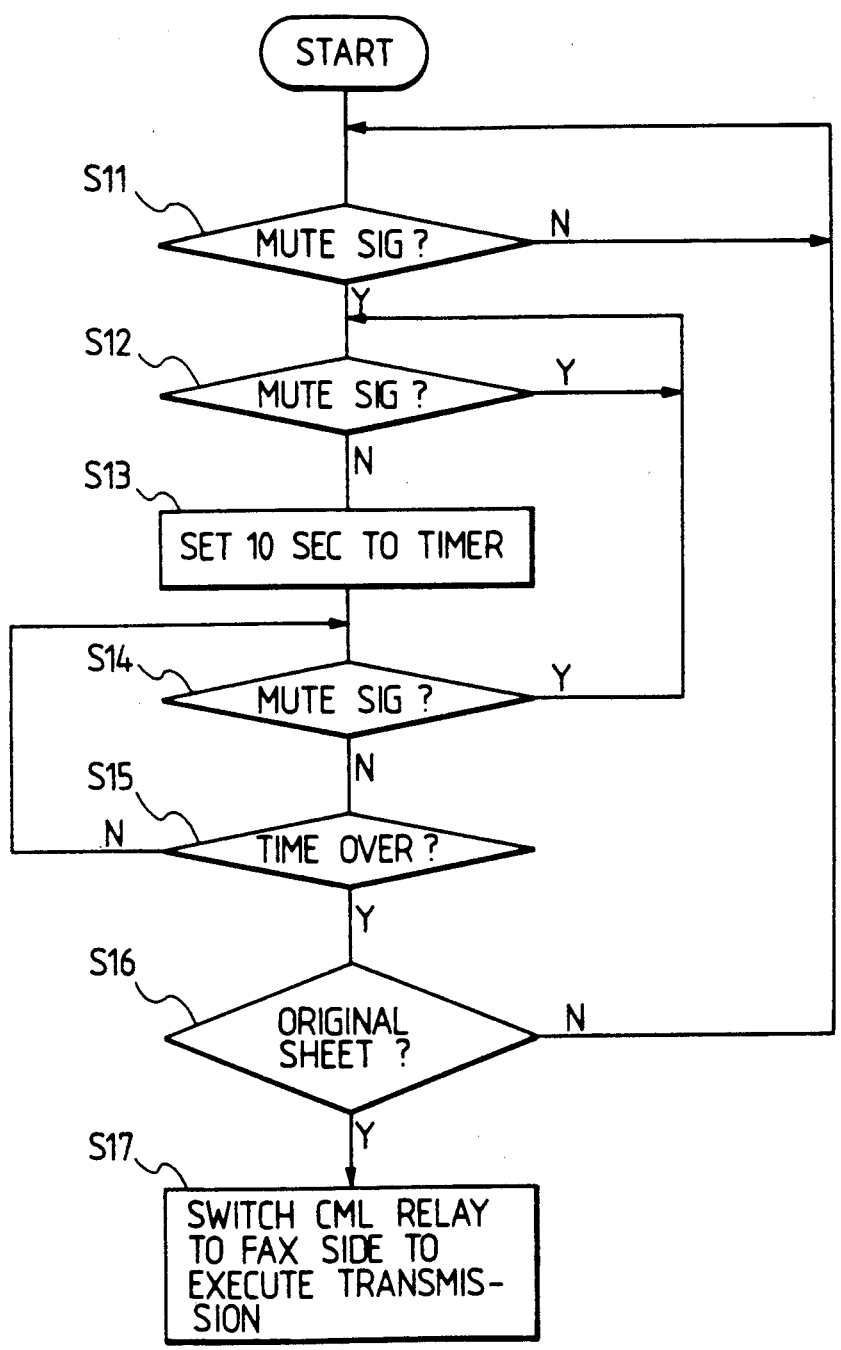
FIG. 7 is a flow chart showing a control operation of a CPU in the, second embodiment.

The above operation is explained with reference to FIG. 7. FIG. 7 shows a control process of the control program to be executed by the CPU 1 of FIG. 1 and stored in the ROM 2. It is assumed that the CPU 1 connects the CML relay 22 to the hook switch 28 at the start of the process.

In a step S11 of FIG. 7, the CPU 1 of the facsimile machine detects the presence or absence of the mute signal TMUTE. If the dialing is effected, the light emission of the LED 51a of the photo-coupler of FIG. 5 stops so that the transistor 52 is cut off through the photo-transistor 51b. Thus, the high level dialing detection signal is supplied to the input/output port 53.

If the mute signal TMUTE is detected, the process proceeds to a step S12 where it waits until the mute signal terminates. When the mute signal terminates, a 10-second period is set into a software timer and the timer is started in a step S13.

In a step S14, whether the mute signal TMUTE still remains or not is checked. If the mute signal still remains and the dialing signal is being sent, the process returns to the step S12. When the mute signal terminates, the process proceeds to a step S15 where the time-out of the timer started in the step S13 is checked. If ten seconds have not been elapsed, the process returns to the step S14. Namely, the process proceeds to a step S16 ten seconds after the end of the dialing.

In the step S16, the presence or absence of the document sheet is checked. The presence or absence of the document sheet is detected by the document sheet sensor provided in the reader 7. In case of the memory transmission, whether the transmission image has been stored in the memory or not is checked. If the document sheet has not been loaded, it means the normal telephone communication and the connection of the CML relay 22 are not changed (connected to the hook switch 28). Then, the process returns to the step S11.

On the other hand, if the document sheet has been loaded, the CML relay 22 of FIG. 4 is switched to the facsimile machine and the process proceeds to a step S17 to effect the transmission operation. That is, the reading of the document sheet by the reader 7, the encoding and the transmission through the modem 8 are effected.

The telephone number data used in the dialing may be input from the ten-key 31, or when one-touch key is used, corresponding telephone number data stored in the non-volatile RAM 4 or the memory built in the dialer 30 may be used.

In this manner, facsimile image transmission is automatically effected if the document sheet to be transmitted is loaded in the reader 7, by merely dialing through the ten-key or one-touch key.

In the present embodiment, only the photo-coupler for detecting the mute signal of the dialer 30 and the peripheral circuit thereof need be added to the conventional apparatus. Therefore, the cost does not increase greatly.

In the above embodiments, the same control is attained by the operation of either the ten-key or the one-touch key. Alternatively, the control may be switched depending on the keys used for the dialing.

Figure 8:
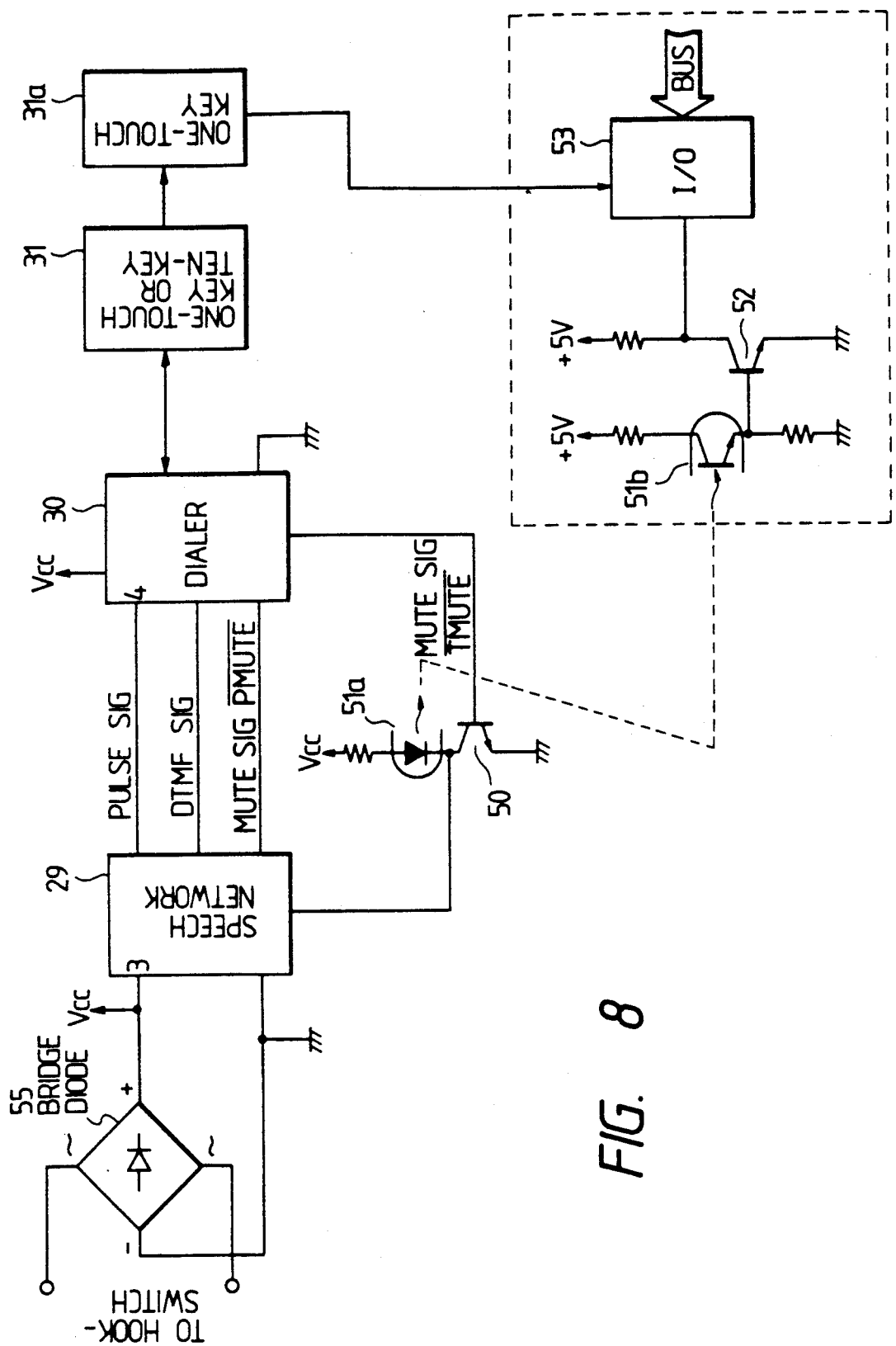
FIG. 8 shows a modification of the configuration of FIG. 5.

For example, a double contact circuit 31a shown in FIG. 8 may be provided only in the one-touch key of the ten-key/one-touch key 31 of FIG. 5 so that the detection signal is supplied to the I/O port 53 only when the one-touch key is depressed. In this manner, the CPU 1 can detect whether the dialing has been effected by the one-touch key or not. The depression signal for the one-touch key is supplied to the dialer 30 as is done in the previous embodiment. The double contact circuit 31a may be readily attained by adding the contact circuit of the one-touch key.

Figure 9:
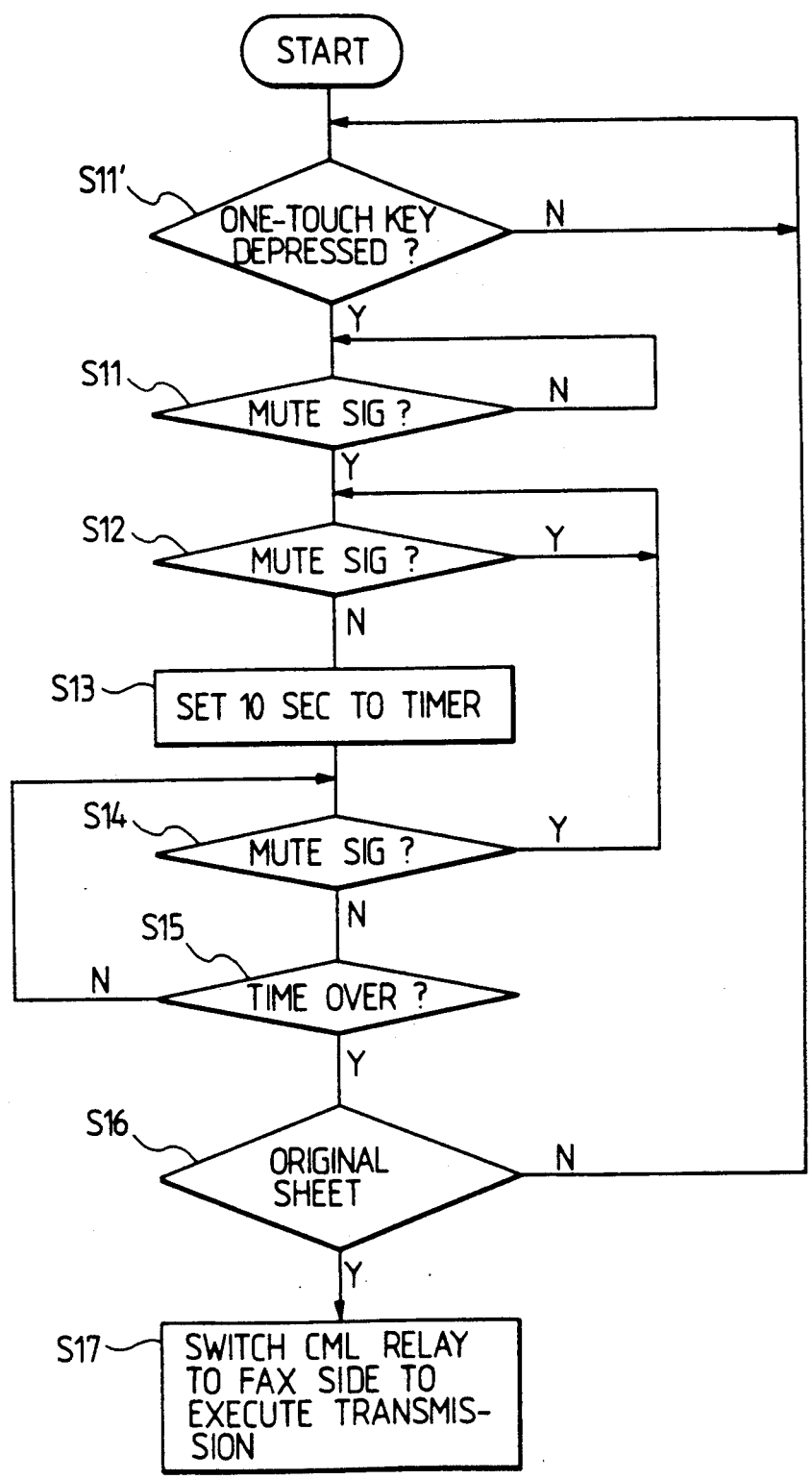
FIG. 9 is a flow chart showing a control process in the configuration of FIG. 8.

The flow chart of FIG. 7 is changed as shown in FIG. 9. In a step S11' prior to the step S11, whether the dialing has been effected by the one-touch key or not is checked through the double contact circuit 31a, and only when the dialing is effected by the one-touch key, the steps S11 et seq., which are identical to those of FIG. 7, are executed.

In this manner, the facsimile communication may be started in response to the detection of the document sheet and the detection of the dialing only when the dialing is effected by the one-touch key. In case of the direct dialing by the ten-key or shortened dialing system, the automatic start of the facsimile communication is not effected. Accordingly, where the destination station shares one line by the telephone set and the facsimile machine and it is not known whether it will be an operator or a facsimile machine which will respond, the normal call operation may be effected by the ten-key. If it is known that the destination station is a facsimile machine, the dialing may be effected by the one-touch key so that the facsimile communication is automatically started.

While the facsimile machine has been explained, it is apparent that a similar control can be attained where other data communication apparatus is combined with the telephone set. In this case, the data transmission status may be detected through various control or operation conditions such as the loading of a floppy disk which contains data to be transmitted and execution status of software.

While the data communication apparatus and the telephone set are integral in the above embodiments, the same technique is applicable where they are separate and installed closely to each other.

The present invention is not limited to the above embodiments but various modifications thereof may be made.

We claim:

1. A data communication apparatus in which a telephone set and a line are connectable, comprising:
    data communication means for performing data communication;
    switching means for selectively connecting the telephone set or said data communication means with the line;
    detection means for detecting whether a signal associated with the data communication has been received by the detection means or not, when a dial signal from the telephone set is sent onto the line; and
    control means for controlling said switching means to perform selective connection of the data communication means to the line, in response to a positive detection by said detection means during dialing through the telephone set, so as to start the data communication.

2. An apparatus according to claim 1, further comprising data detection means for detecting whether data to be sent by said data communication means has been set or not, wherein said control means changes over the switching means on the condition that the data to be sent has been set.

3. A communication apparatus according to claim 1 wherein said data is image data.

4. A data communication apparatus in which a telephone set and a line are connectable, comprising:
    data communication means for performing data communication;
    switching means for selectively connecting the telephone set or said data communication means with the line;
    first detection means for detecting whether a dial signal from the telephone set has been sent onto the line or not;
    second detection means for detecting whether data to be sent by said data communication means has been set or not; and
    control means for controlling said switching means to perform selective connection of the data communication means to the line, on the basis of positive detection by said first and second detection means using dialing through the telephone set, so as to start the data communication.

5. An apparatus according to claim 4, wherein said control means changes over the switching means on the condition that the data to be sent is set when the end of the dialing through the telephone set is discriminated on the basis of detection by said first detection means.

6. An apparatus according to claim 4, wherein said telephone set includes one-touch key dialing means and ten-key dialing means.

7. A data communication system in which speech communication through a telephone set or data communication through data communication means selectively occupies one line, said system comprising:
    switching means for selectively connecting the line to the telephone set or the data communication means;
    detection means for detecting whether a signal associated with the data communication has been received by the dection means or not when a dial signal from the telephone set is sent onto the line; and
    control means for controlling said switching means to perform selective connection of the data communication means to the line, in response to a positive detection by said detection means, so as to start the data communication.

8. A system according to claim 7, further comprising data detection means for detecting whether data to be sent by said data communication means has been set or not, wherein said control means changes over the switching means on the condition that the data to be sent has been set.

9. A data communication system in which speech communication through a telephone set or data communication through data communication means selectively occupies one line, said system comprising:

switching means for selectively connecting the line to the telephone set or the data communication means;

first detection means for detecting a dial signal sent from the telephone set to the line;

second detection means for detecting whether data to be sent by the communication means has been set or not; and control means for controlling said switching means to perform selective connection of the data communication means to the line, on the basis of positive detection by said first and second detection means, so as to start the data communication.

10. A system according to claim 9, wherein said control means changes over the switching means on the condition that the data to be sent is set, when the end of the dialing through the telephone set is discriminated on the basis of detection by said first detection means.

* * * * *

UNITED STATES PATENT AND TRADEMARK OFFICE
CERTIFICATE OF CORRECTION

PATENT NO. : 5,018,189

DATED : May 21, 1991

INVENTOR(S) : YUJI KUROSAWA, ET AL.

It is certified that error appears in the above-identified patent and that said Letters Patent is hereby corrected as shown below:

ON THE TITLE PAGE:

IN [30] FOREIGN APPLICATION PRIORITY DATA

"Jun. 26, 1988 [JP] Japan" should read
--Jun. 23, 1988 [JP] Japan--.

COLUMN 1

Line 17, "iine" should read --line--.
Line 19, "b y" should read --by--

COLUMN 2

Line 22, "the," should read --the--.
Line 55, "well" should read --as well--.

COLUMN 3

Line 5, "for" should read --form--.

UNITED STATES PATENT AND TRADEMARK OFFICE
CERTIFICATE OF CORRECTION

PATENT NO. : 5,018,189

DATED : May 21, 1991

INVENTOR(S) : YUJI KUROSAWA, ET AL.

Page 2 of 2

It is certified that error appears in the above-identified patent and that said Letters Patent is hereby corrected as shown below:

COLUMN 8

Line 64, "dection" should read --detection--.

Signed and Sealed this

Twenty-ninth Day of December, 1992

Attest:

DOUGLAS B. COMER

*Attesting Officer*    *Acting Commissioner of Patents and Trademarks*